US009129398B2

(12) United States Patent
Kim

(10) Patent No.: US 9,129,398 B2
(45) Date of Patent: Sep. 8, 2015

(54) EDGEL SAMPLING FOR EDGE-BASED TRACKING

(71) Applicant: QUALCOMM Incorporated, San Diego, CA (US)

(72) Inventor: Kiyoung Kim, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 13/843,603

(22) Filed: Mar. 15, 2013

(65) Prior Publication Data
US 2014/0270360 A1  Sep. 18, 2014

(51) Int. Cl.
G06K 9/00 (2006.01)
G06T 7/20 (2006.01)

(52) U.S. Cl.
CPC ..... G06T 7/2033 (2013.01); G06T 2207/20021 (2013.01); G06T 2207/30244 (2013.01)

(58) Field of Classification Search
USPC ......... 382/103, 107, 209, 216, 266, 269, 282; 358/537, 538, 452, 542
See application file for complete search history.

(56) References Cited

U.S. PATENT DOCUMENTS

| 5,748,231 | A  | * | 5/1998  | Park et al. ............... 348/207.99 |
| 6,529,613 | B1 | * | 3/2003  | Astle ............................ 382/103 |
| 8,126,260 | B2 | * | 2/2012  | Wallack et al. .............. 382/154 |
| 8,131,011 | B2 | * | 3/2012  | Nevatia et al. ............... 382/103 |
| 8,315,965 | B2 | * | 11/2012 | Shet ............................... 706/47 |
| 8,437,502 | B1 | * | 5/2013  | Siddiqui et al. .............. 382/103 |
| 8,589,410 | B2 | * | 11/2013 | Sud et al. ...................... 707/748 |
| 8,600,192 | B2 | * | 12/2013 | Liu et al. ...................... 382/285 |
| 8,917,905 | B1 | * | 12/2014 | Dill ............................... 382/103 |
| 8,958,600 | B2 | * | 2/2015  | Othmezouri et al. ......... 382/103 |
| 2010/0027863 | A1 |   | 2/2010  | Venkataraman et al. |
| 2010/0194679 | A1 |   | 8/2010  | Wu et al. |
| 2011/0221895 | A1 |   | 9/2011  | Sharma |
| 2012/0070070 | A1 |   | 3/2012  | Litvak |
| 2012/0281872 | A1 |   | 11/2012 | Zitnick, III |

OTHER PUBLICATIONS

Eade E., et al., "Edge landmarks in monocular SLAM", Image and Vision Computing, Elsevier, Guildford, GB, vol. 27, No. 5, Apr. 2, 2009, pp. 588-596, XP026077880, ISSN: 0262-8856.
International Search Report and Written Opinion—PCT/US2014/018794—ISA/EPO—Dec. 15, 2014.

* cited by examiner

Primary Examiner — Yosef Kassa
(74) Attorney, Agent, or Firm — Silicon Valley Patent Group LLP

(57) ABSTRACT

Embodiments include selecting edgels for edge based tracking by dividing a reference image frame (RF) into N×M bins of pixels and projecting a subset of the edgels per bin into a current image frame (CF) using an estimated pose to identify valid bins of the RF as bins having their projected one edgel found within the borders of the CF. Then, K edgels of RF with different orientations from each valid bins may be selected. Then, the selected RF edgels of bins may be reduced by removing bins randomly, or first removing bins from the center of the RF of the image (then next removing the next further outward bins), until a desirable edgel number is obtained. Edge-based tracking can then be performed using the desirable edgel number, to track edges in current frame that are found in prior frame.

47 Claims, 7 Drawing Sheets

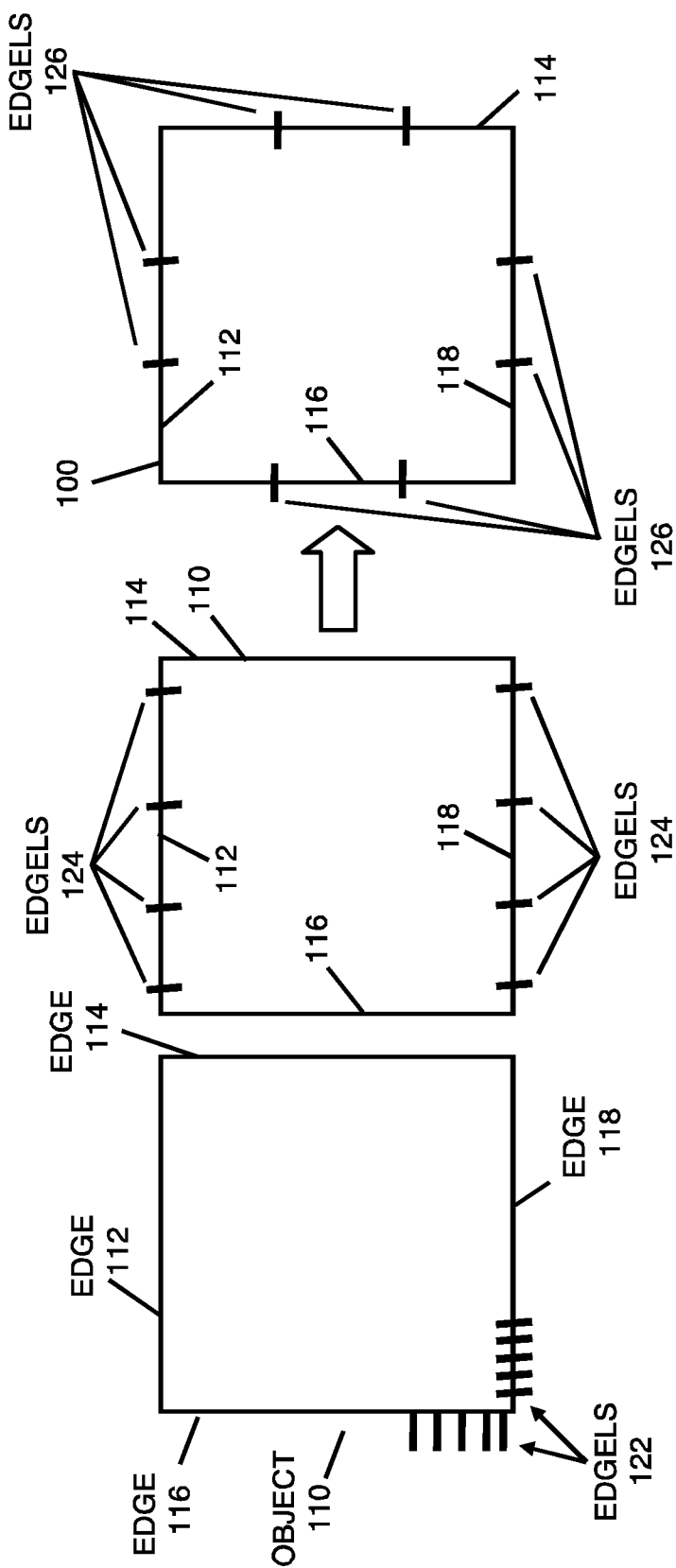

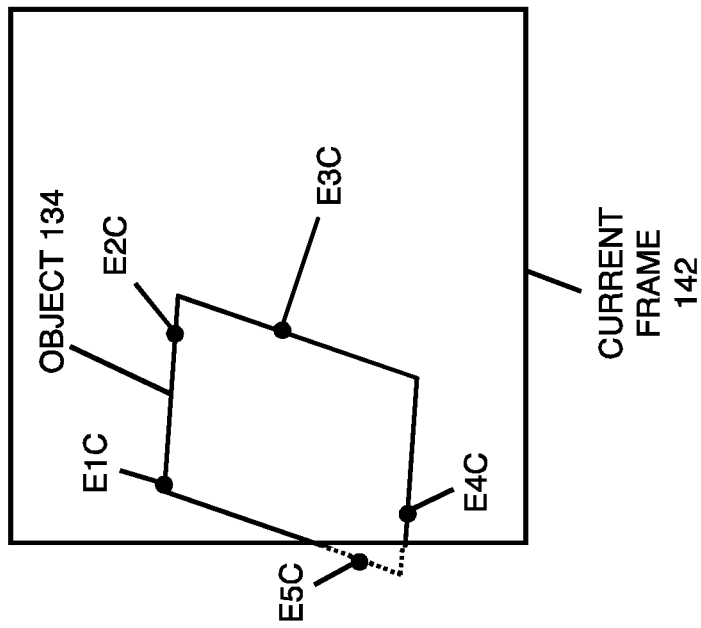
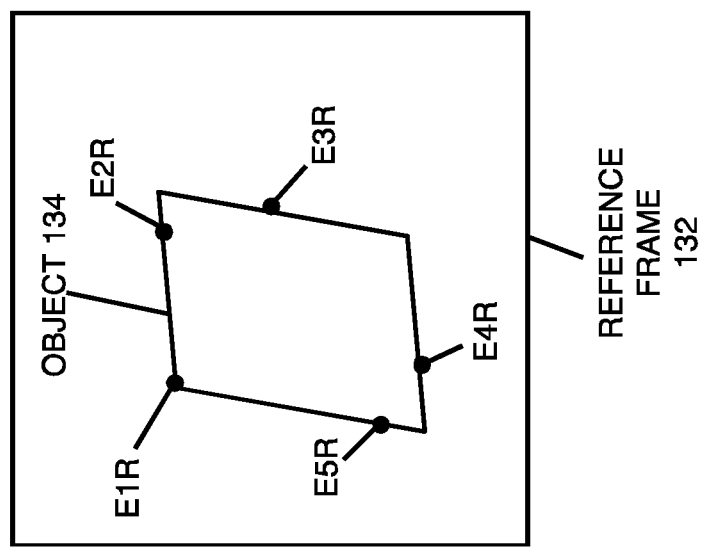
FIG. 1D

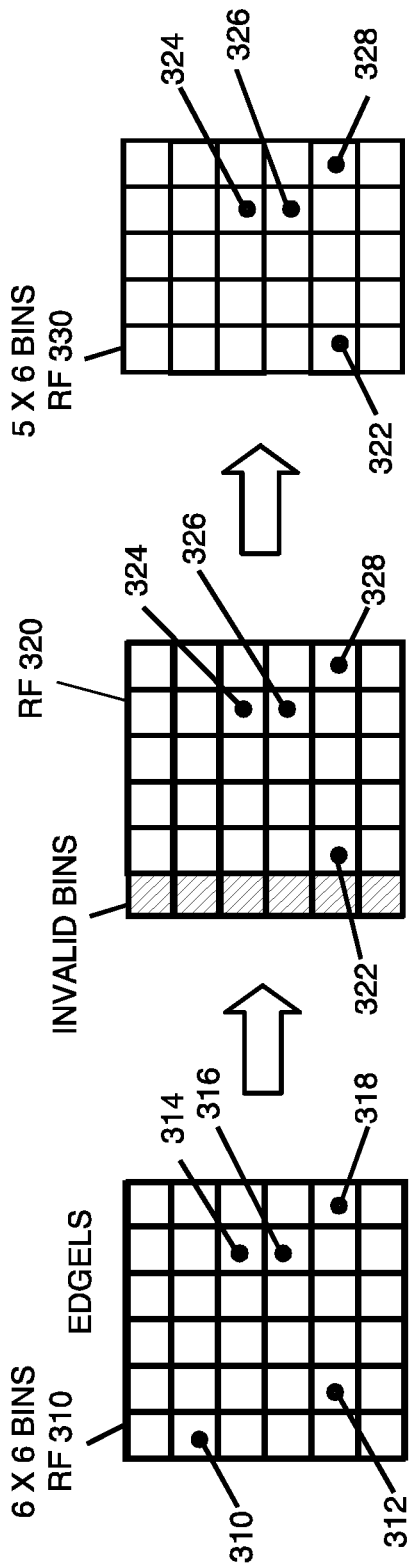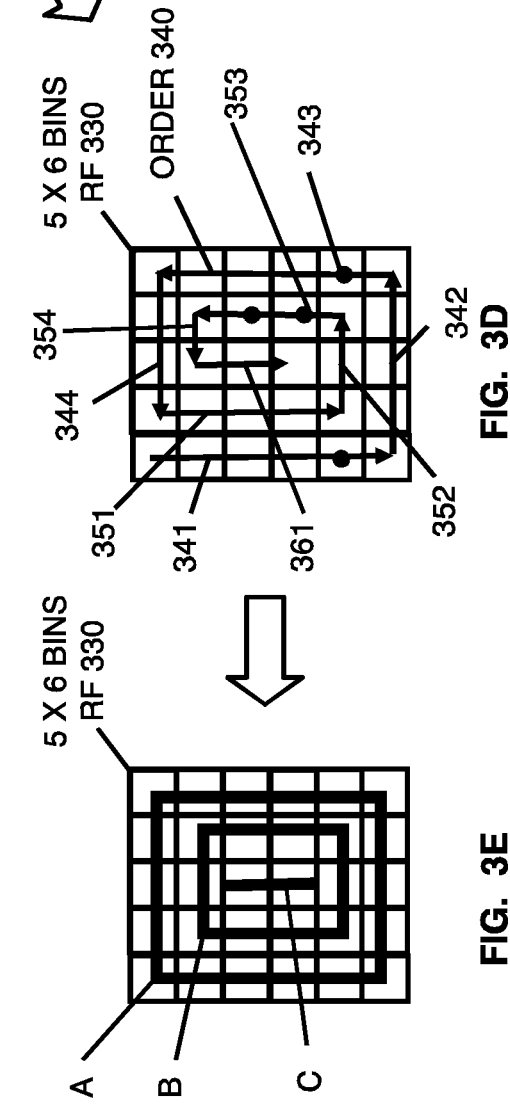

EDGEL SAMPLING FOR EDGE-BASED TRACKING

FIELD

The subject matter disclosed herein relates to computer vision, in general and to edge based tracking, in particular.

BACKGROUND

Object detection is often used in many computer vision based applications along with camera pose estimation to register the appearance of virtual objects so that real world images augmented with the virtual objects can be displayed. Camera pose refers to the position and orientation of the camera relative to a frame of reference. Registration, image registration or image alignment refers to the process of transforming and/or integrating different data sets to a single coordinate system or a common frame of reference.

Conventional tracking methods, which often use edge-based tracking, sample a large number of image pixels to detect potential edges. Moreover, the sampling is repeated for every image frame. Therefore, conventional edge-based trackers incur high computational overhead and suffer from increased tracking time because of the large number of edges tracked. The computational overhead and tracking time delays associated with conventional edge-based trackers limit their applicability.

Therefore, there is a need for efficient edge-based tracking methods that reduce the computational overhead and tracking time delays, while maintain reliability.

SUMMARY

Embodiments described herein provide methods, devices, systems, and software for obtaining optimal conditions for determining a cameras pose, or camera pose updates, such as by determining the camera pose calculated based on object edges identified in the image frames of images obtained by the camera. The optimal conditions may include selecting appropriate edgels for the tracking phase, selecting a proper number of edgels for the tracking phase, and/or selecting which frames of the sequence of frames to sample (e.g., the sampled frames are fewer than the each or all of the sequence of frames over a period of time). By obtaining such optimal conditions for determining a cameras pose, it is possible to get the sub-optimal (numerically stable) edgels with significantly less projections; and it is possible to reduce the tracking time, processing, and power used to perform the tracking phase.

Some embodiments of obtaining such optimal conditions for determining a cameras pose include methods, devices, systems, and software for obtaining edgels of reference image frame (RF), then dividing the RF frame into N×M bins of pixels and extracting Q edgels of RF with a strong magnitude of illumination gradient for each bin. This allows one edgel per bin (strongest gradient) of RF to be projected into the current image frame (CF) using an estimated pose based on a prior image frame (PF) so that "valid" bins of RF can be identified as bins having their projected one edgel found within the borders of the current image frame. Optionally, the difference between the number of valid bins of the current frame and the number of valid bins of the prior frame can be calculated so that if the difference is greater than a threshold, the CF is not sampled (e.g., edgels of PF can be used for tracking). Also, optionally, if the CF is to be sampled, only the valid bins as N*×M* bins of RF can be selected or rearranged. Next, K edgels of RF with different orientations from each valid bin can be selected. Then, the selected RF edgels of bins can be reduced from the center of the RF of the image first (then next further outward bins), until number of remaining edgels is less than a desirable edgel number. Once the desirable number of edgels remain (e.g., that number or less remain after reduction), edge-based tracking can be performed to track edges in current frame that are found in prior frame.

Some embodiments are directed to a machine implemented method comprising: obtaining a reference image frame of pixel data having an RF object to be tracked in a current image frame of pixel data; obtaining RF object edgels of the RF object; dividing the RF into N×M bins of the RF of pixel data; and selecting a subset of K edgels of the RF object edgels, each of the K edgels within a different angular orientation range of a plurality of valid bins of the N×M bins, each valid bin having a strongest magnitude gradient RF object edgel found within borders of the CF of pixel data.

Some embodiments are directed to a device comprising: an edgel selection computer module configured to: obtain a reference image frame of pixel data having an RF object to be tracked in a current image frame of pixel data; obtain RF object edgels of the RF object; divide the RF into N×M bins of the RF of pixel data; and select a subset of K edgels of the RF object edgels, each of the K edgels within a different angular orientation range of a plurality of valid bins of the N×M bins, each valid bin having a strongest magnitude gradient RF object edgel found within borders of the CF of pixel data.

Some embodiments are directed to a computer program product comprising a computer-readable medium comprising code for: obtaining a reference image frame of pixel data having an RF object to be tracked in a current image frame of pixel data; obtaining RF object edgels of the RF object; dividing the RF into N×M bins of the RF of pixel data; and selecting a subset of K edgels of the RF object edgels, each of the K edgels within a different angular orientation range of a plurality of valid bins of the N×M bins, each valid bin having a strongest magnitude gradient RF object edgel found within borders of the CF of pixel data.

Some embodiments are directed to a computing device comprising: a means for obtaining a reference image frame of pixel data having an RF object to be tracked in a current image frame of pixel data; a means for obtaining edgels of the RF object; a means for dividing the RF into N×M bins of the RF of pixel data; and a means for selecting a subset of K edgels of the RF object edgels, each of the K edgels within a different angular orientation range of a plurality of valid bins of the N×M bins, each valid bin having a strongest magnitude gradient RF object edgel found within borders of the CF of pixel data.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 1A shows an example of an uneven suboptimal spatial distribution of edgels for tracking.

FIG. 1B shows an example of an uneven suboptimal angular orientation edgel distribution for tracking.

FIG. 1C shows an example of a more even distribution edgels in the spatial domain and angular orientation domain for tracking.

FIG. 1D shows an example of an object in a reference image frame, and at least a portion of that object in a current image frame.

FIG. 3A shows an example of an image of a reference frame divided into six by six bins defined by 5×5 the hash marks within the image boundary.

FIG. 3B shows an example of bins of a RF identified as valid (clear or with edgels) and invalid (blacked out).

FIG. 3C shows an example of selecting only the valid bins.

FIG. 3D shows an example of an order of processing the bins or selecting K edgels with different angular values in each bin.

FIG. 3E shows an example of selecting reduced edgel numbers to keep the number of edgels for tracking less than or equal to some threshold edgel number.

DETAILED DESCRIPTION

Figure 2A:
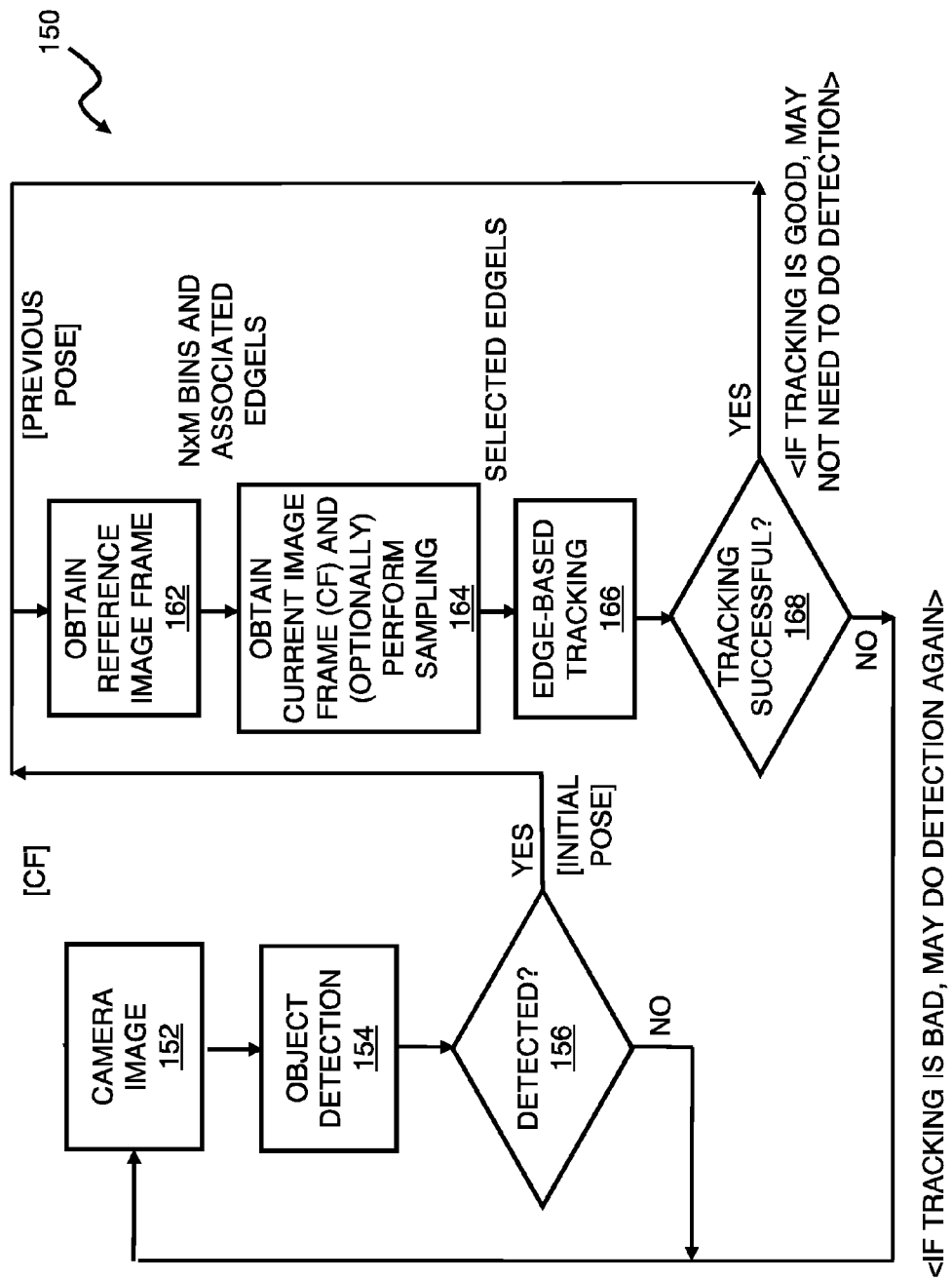
FIG. 2A shows an example of an overview of a process for object detection and edge based tracking.

An edge-based tracker may be used to determine or estimate camera position and orientation (pose) for tracking. In tracking, which is used in many Augmented Reality (AR) applications, the position and orientation of virtual objects in an image frame seen by a user may be adapted to correspond to camera pose. For example, in Computer Vision (CV) or AR applications, planar or 3D objects may be tracked. Edge-based tracking may be performed in a sequence of image frames or images taken by the camera. In edge base tracking, an edge based tracker may sample edges of objects in image frames obtained by the camera, such as by selecting one or more edges to be tracked in subsequent frames to facilitate calculation of the camera pose for the subsequent frames. Various edge detection methods such as the Hough Transform, Canny edge detection algorithm and its variants, second order algorithms, and other edge detection algorithms may be used to detect edges. For example, the sampling may select "edgels" or an edgel data set in a reference frame (RF) and the edgels may be searched in a subsequent current frame (CF) in the tracking phase.

In some cases, an "edgel" or "edge element" or "edge pixel", which may be an edge segment, may refer to a pixel in an image that has the characteristics of an edge in an imaged object. In some cases, an edgel may be represented by a location (e.g., a position in two dimensions (2D), or, in 3 dimensions (3D)) of an edge pixel, a direction normal to the edge at that location (e.g., orientation of a direction normal to the direction defined by the line or curve of the edge, such as in 2D or 3D), and a magnitude (e.g., gradient) of the luminance change across the edge in the normal direction at that location (such as in 2D or 3D).

Typically, in conventional methods, a larger the number of edgels, when appropriately selected, may result in more reliable tracking. However, a larger number of edgels may be computationally expensive, power intensive, and increase tracking time. On the other hand, if too few edgels are to searched, tracking performance may be degraded, and in some situations, cannot be performed with any accuracy. Thus, embodiments disclosed herein facilitate selection of an optimal edgel set while maintaining tracking accuracy and performance.

Moreover, additional inefficiencies are introduced because conventional methods perform edgel sampling at every frame. Therefore, embodiments disclosed herein, facilitate an optimal selection of frames for edgel sampling thereby permitting additional reductions in tracking time, processing overheads, and power consumption. In some embodiments, efficiencies are obtained, in part, because the optimal selection results in the sampling of fewer frames.

Embodiments described herein provide methods, devices, systems, and software for obtaining optimal conditions for determining a camera pose, or camera pose updates, based on edges identified in the image frames of images obtained by a camera. The optimal conditions facilitate selection of: appropriate edgels for tracking, an optimal number of edgels for tracking, and/or an optimal selection of frames in the sequence of frames to sample. For example, the optimal selection of frames may result in fewer frames being sampled than the entire set of frames in an image frame sequence during a time period.

In some embodiments, selecting appropriate edgels and an optimal number of edgels for the tracking phase may include selecting spatially well-distributed edgels, such as edgels that are more evenly spaced with respect to each other along an edge, which may lie on an object in the image. For example, the selection process may favor the selection of edgels that are not concentrated in a specific area, and/or may disfavor the selection of edgels that converge in a specific area. When edgels are converged in a specific area, tracking computations may not be numerical stable. In some embodiments, the criteria may result in the selection of well-distributed edgels on the image plane.

In some embodiments, the criteria for selecting appropriate edgels and an optimal number of edgels for tracking may facilitate selection of edgels that are well distributed in an angular orientation domain (hereinafter "angular domain"). Edgels that well-distributed in an angular domain exhibit more even angular spacing with respect to the angular orientation of the edgels along an edge, which may lie on an object in the image. In some embodiments, the angular orientation may be considered as being between 0 degrees and 180 degrees. For example, a 0 degree angular orientation, may be thought of as pointing from left to right in the frame. In some embodiments, angular orientations between 180° and 360° may define repeats of the edgels having angular orientations between 0 and 180°.

In some embodiments, selecting well distributed angular orientation edgels may include favoring the selection of edgels that are in different angular segments or subdivisions of an image frame; and/or disfavoring the selection of edgels that are oriented in the same or similar directions. The selection of edges that are not oriented in the same direction may facilitate edgel convergence during tracking in edge-based trackers. For example, if edgels with same normal vector are used for pose computation (such as may occur with an ill-conditioned case), a lack of adequate degrees of freedom (DoFs) for pose computation may result and the tracker may not be able to determine the pose. The lack of edgel convergence may be exacerbated, if during tracking computations, the optimization criterion is a combination of the normal vector and the distance between corresponding edges (in a reference frame and a subsequent frame). In the example just described above, the optimal position of two horizontal edges with different heights case may be any of the centers of two edges and it may not be possible to determine an optimal position without, for example, also having two vertical edges. Thus, suboptimal selection of edgels with respect to angular orientation (such as when edgels with same normal vectors are used) may result in an ill-conditioned pose estimation problem during tracking.

FIG. 1A shows an example of an uneven suboptimal spatial distribution of edgels for tracking FIG. 1A shows object 110 having edges 112, 114, 116 and 118. Object 110 may be an object in a reference frame (RF) or reference image frame to be used for tracking, such as noted below for FIG. 2A-B. The edgels of object 110 may be considered or used for tracking the object 110 from the reference frame (RF) in a subsequent current frame (CF) (e.g., a later in time image relative to the reference frame taken by the same camera). After selecting the edgels, their positions can be searched for in the next camera frame. That is, edgels of object 110 selected in the RF may be searched and compared with edgels in the CF (e.g., corresponding edgels of the same object) to perform tracking. Then, using the corresponding relations of the edgels in the two frames, it is possible to compute or estimate the pose of the camera taking the CF.

FIG. 1A shows suboptimally distributed spatial domain edgels 122 concentrated in the lower left corner of the object. FIG. 1A may represent a case of suboptimal sampling (e.g., suboptimal choice of edgel selection) for tracking where the object is a square object. Using edgels 122 for tracking may provide dense (many) edgels for tracking (possibly more reliable tracking) of the corner, but may increase the time used to perform that tracking (possibly significantly).

Accordingly, in some embodiments, an optimal selection of spatial domain edgels for tracking may include edgels along other edges of the object (e.g., edges 112 and 114) and/or fewer edgels in concentrated in the lower left corner.

FIG. 1B shows an example of an uneven suboptimal angular orientation edgel distribution for tracking. For example, the edgels shown in FIG. 1B may be the edgels of an object in a RF to be used for tracking FIG. 1B shows suboptimally distributed angular orientation domain edgels 124 normally along the top and bottom edges 112 and 118 the object. FIG. 1B may represent a case of suboptimal sampling where using positions of edgels 124 for tracking will provide dense edgels for tracking of the top and bottom edges, but will increase the time used to perform that tracking (possibly significantly), and, in addition, in some instances, may lead to a tracking stability problem.

In some embodiments, an optimal selection of edgels with respect to their angular orientation for tracking may include edgels along the left and/or right edges of the object (e.g., edges 116 and 114) and/or fewer edgels on the top and bottom edges of the object. Thus, for the example shown in FIG. 1B, an optimal edgel selection may include at least one edgel on each of edges 112, 114, 116 and 118, and/or fewer edgels along edges 112 and 118.

FIG. 1C shows an example of a more even distribution edgels in the spatial domain and angular orientation domain for tracking FIG. 1C shows well distributed spatial domain and angular orientation domain edgels 126, normally spaced along all of the edges 112-118 of the object. Here, the edgels are more evenly spaced along each of the borders than that shown in FIG. 1A. As compared to FIGS. 1A-1B, the edgels in FIG. 1C also exist on the left and right as well as top and bottom borders. Edgels 126 are also more evenly separated in the angular domain. Some embodiments may select edgels along multiple edges of the object and in various or all angular orientations.

In some cases, FIG. 1C may represent an example case of optimal sampling where using positions of edgels 126 for tracking will provide dense enough edgels for tracking (sufficiently reliable tracking) of all the edges, but will decrease the time used to perform that tracking (possibly significantly). Thus, FIG. 1C may provide greater numerical stability and faster convergence during tracking. Accordingly, for the example in FIG. 1C, in some embodiments, an optimal selection of edgels for tracking may include at least one or two edgels on each edge, and fewer edgels from edgels 122 or 124.

Although object 110 is shown as a square, it can be appreciated that the concepts described herein apply to other more simple or more sophisticated shapes. Such shapes may include shapes with linear, curved, or other shaped edges and/or contours. It can also be appreciated the image frame containing object 110 may include other objects, edges, and/or edgels. The image frames described herein may be or include still image frames or video frames captured by a camera.

FIG. 1D shows object 134 in reference image frame 132, and at least a portion of object 134, in current subsequent image frame 142 (e.g., a later in time image frame taken by the same camera). Part of object 134 (e.g., the left bottom corner) is not within frame 142 (e.g., it is beyond the left border or boundary of the frame as shown by the dashed lines). Object 134 includes edgels E1R, E2R, E3R, E4R and E5R within reference frame 132. Object 134 includes edgels E1C, E2C, E3C, and E4C within current frame 142, where edgels E1C, E2C, E3C, and E4C correspond to edgels E1R, E2R, E3R and E4R. However, an edgel corresponding to E5R (e.g., edgel E5C) is not within current frame 142 (e.g., it is beyond the left border or boundary of the frame as shown by its location one the dashed lines).

The edgels of object 134 may be used to track the object from reference frame 132 in subsequent current frame 142. After selecting edgels E1R, E2R, E3R, E4R and E5R within reference frame 132, their positions can be searched for in camera subsequent frame, such as current frame 142 to identify corresponding edgels E1C, E2C, E3C, and E4C. Thus, edgels of object 134 selected in the RF may be searched and compared with corresponding edgels of object 134 in the CF to perform tracking (e.g., such as explained herein for an edge-based tracker computer module, or at blocks 166-168 or 290). The corresponding relations may include the locations (e.g., positions) and orientations of the same identified edgels, edges or objects in the two frames. These locations and orientations may be different (e.g., may have moved) from one frame to the next (e.g., as shown). Then, using the corresponding relations of the edgels in the two frames, it is possible to compute the 6 Degrees of Freedom (DOF) pose of the camera taking the image frames (e.g., such as explained herein for a pose prediction computer module.

FIG. 2A shows an overview of a process for object detection and edge based tracking. It shows process 150 including camera image block 152, objection detection block 154 and decision block 156 to determine whether the object has been successfully detected. It also shows that process as including obtaining reference image frame block 162, sampling block 164, edge-based tracking block 166 and decision block 168 to determine whether the object has been successfully tracked.

At block 152, a camera image may be obtained. This image may include one or more reference image frames (RF). In some cases, block 152 may use processes known in the art to obtain a camera image.

At block 154, one or more objects may be detected in the image. In some cases, block 154 may use processes known in the art to detect one or more objects in an image.

If at decision block 156, a sufficient number of objects are not detected at block 154 in the image obtained in block 152, process 150 returns to block 152 where another image is obtained (e.g., multiple images or additional images may be used for detection at block 154.

At block 156, if a sufficient number of objects are detected in the image from block 152, process 150 continues to obtain a reference image frame at block 162. In some cases, block 156 may use processes known in the art to determine if the desired object of block is detected.

In some embodiments, the RF image obtained at Block 162 may be a reference image frame for the object(s) detected at block 154, (for example when performing a first edge-based tracking for the object). In alternative embodiments, (e.g., for a second or subsequent tracking, see blocks 254 and 290) the RF image obtained at Block 162 may be a from a prior image frame for the object sampled at block 164. Block 162 may include obtaining or providing RF input including edgels selected or detected from. In some cases, block 162 may include obtaining or providing RF input including edgels selected or detected from a prior image frame for the object sampled at block 164.

At block 162, the known reference image frame may include edgels of edges of objects detected by initial detection of objects in an image frame such as during system start up where the current frame is the first image frame taken by a camera (e.g., at block 152) and a reference frame used for the initial detection is an image stored in memory of the device (e.g., stored in memory or obtained from remote data). In some cases, the edgels may be detected by object detection or relocalization of objects in an image frame taken by a camera, after tracking had failed. The detected edgels may then be considered as part of the known reference for subsequent tracking and pose determination. At block 162, the reference frame RF may be divided into N×M bins and associated edgels as described herein.

After block 162, process 150 continues to block 164 to obtain a current image frame (CF) and optionally sample edgels for the CF (e.g., to determine whether the object detected in the CF from block 164 will be sampled at block 164, such as using a prior or estimated camera pose). After block 164, object edge-based tracking is performed at block 166 to track the object detected at block 154 (e.g., when the image obtained in block 152 is used as a reference image frame).

At block 166, object edge-based tracking in a subsequent frame (e.g., the CF of block 164), of the RF object detected at block 154 is performed, such as based on edgels detected of the RF object detected at block 154. At decision block 168 it is determined whether the object has been successfully tracked. In some cases, block 168 may use processes known in the art to determine whether the object has been successfully tracked.

If tracking is not successful, the process returns to block 152 where another image is obtained and detection is again performed at block 154. If tracking is successful, the process proceeds (e.g., returns) to block 162, where a reference image frame is obtained. This RF may be the prior RF or a new RF which is the prior CF.

After block 162, process 150 continues to block 164 to obtain a second current image frame (CF) and optionally sample the second CF at block 164 (e.g., to determine whether the detected object in the CF from block 164 will be sampled at block 164, such as using a prior, previous or estimated camera pose).

After sampling at block 164, the selected edgels may be used at block 166, where edge-based tracking in a next subsequent frame (e.g., CF), of the object tracked (during the prior visit to block 166) is performed. In some cases, after block 164, object edge-based tracking is performed at block 166, such as to perform a second edge-based tracking to track the object sampled at prior instance of block 164 and/or tracked at prior instance of block 166. At decision block 168 it is again determined whether the object has been successfully tracked.

It is noted that in some cases, Block 164 considers or includes input or edgels selected or detected from a reference image frame of block 162 (e.g., the object detected at block 154 or the object tracked during the prior visit to block 166) or of another prior frame (e.g., see block 254 and 290). In some cases block 164 includes sampling edgels of the CF (e.g., see block 280-290) while in other cases it may include using edgels of the PF (e.g., see block 254-290).

It is noted that in some cases, at block 162, the reference frame RF may be divided into N×M bins and associated edgels as described herein. After sampling at block 164, the selected edgels may be used at block 166, where edge-based tracking in a next subsequent frame (e.g., CF), of the object tracked (during the prior visit to block 166) is performed.

In some cases, edge-based tracking (e.g., block 166) may be described as including blocks 162, 164 and optionally block 168.

Figure 2B:
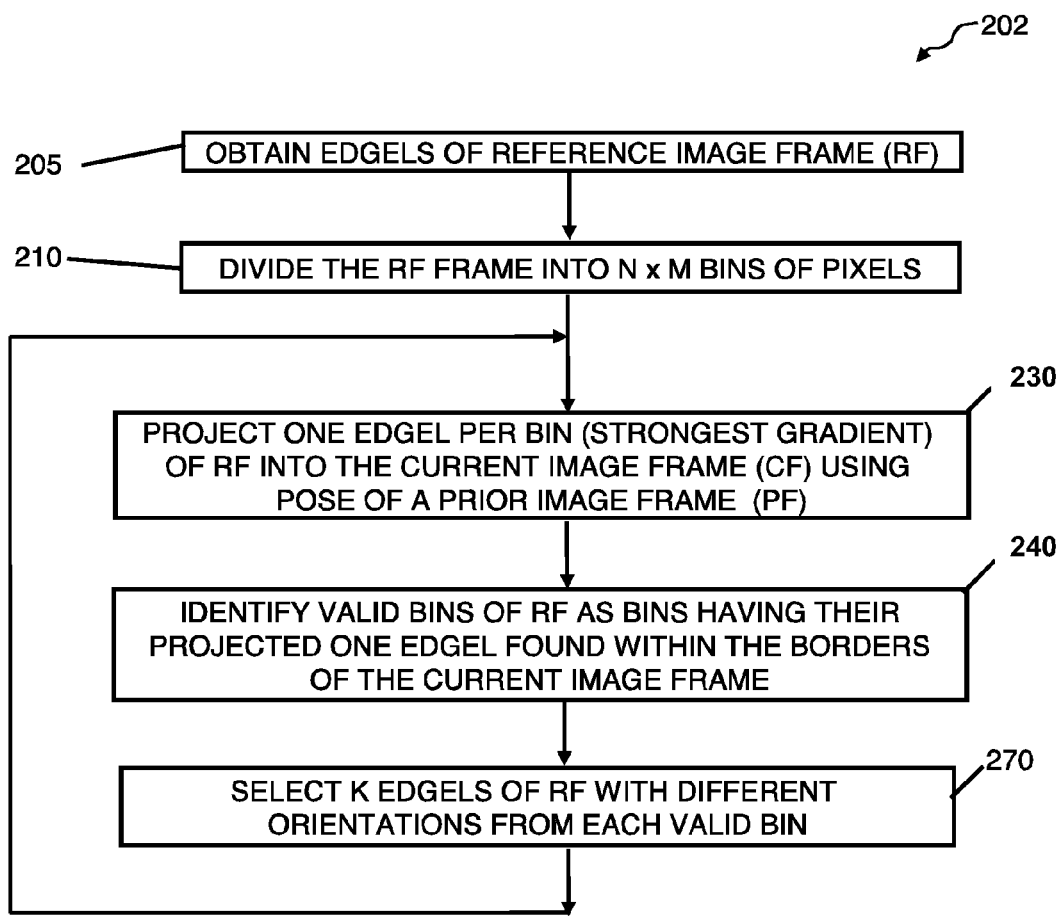
FIG. 2B shows an example of a process for selecting edgels.

FIG. 2B shows an example of a process 202 for selecting edgels for edge based tracking. At block 205, edgels of a reference image frame (RF) are obtained. Block 205 may include descriptions of FIG. 2C for block 205. At block 210, the reference frame is divided into N vertical (e.g., column) by M horizontal (e.g., row) bins of pixel data. Block 210 may include descriptions of FIG. 2C for block 210. At block 230, in some cases, one edgel per bin is projected into the image plane of a current frame (CF). Block 230 may include descriptions of FIG. 2C for block 230. In some embodiments, the number of pixels projected into the image plane of a current frame (CF) per bin may be more than one but may be limited by some threshold.

At block 240 valid bins are identified as bins having their one edgel found within the borders of the image space of the current image frame. In some embodiments, Block 240 may include descriptions of FIG. 2C for block 240. At block 270, K edgels with different orientation are selected from each valid bin. Block 270 may include descriptions of FIG. 2C for block 270.

Figure 2C:
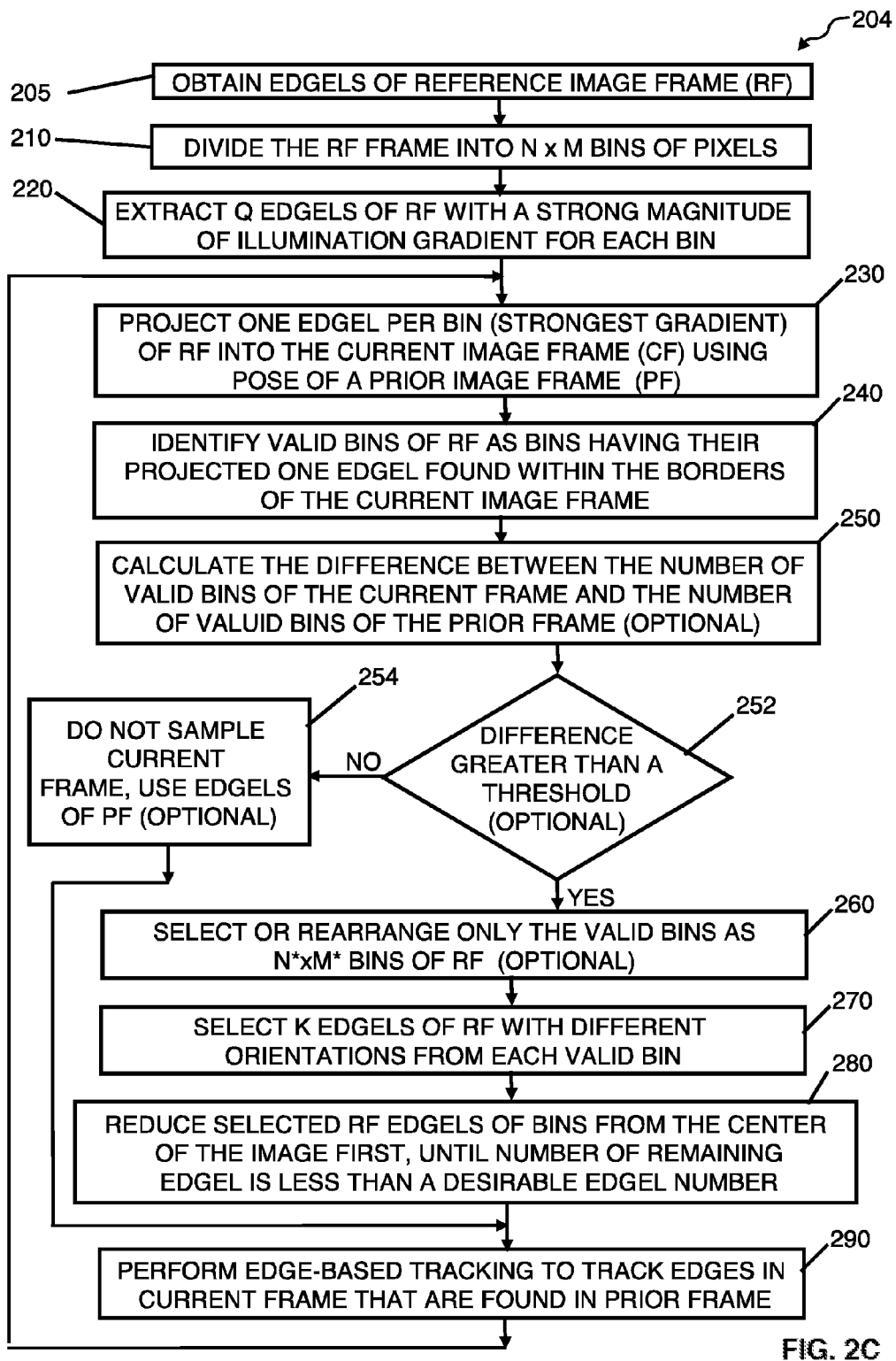
FIG. 2C shows an example of a process for selecting edgels.

In some cases, process 202 FIG. 2B includes blocks 205, 210, 230, 240 and 270 as described for process 204 of FIG. 2C, however, in process 202, block 210 continues to block 230, and block 240 continues to block 270. After block 270, process 202 may return to block 205. In other cases, after block 270, process 202 may perform edge based tracking, such as described for block 290 of FIG. 2C.

FIG. 2C shows process 204, such as a process for selecting edgels. This may include identifying or selecting well distributed edgels in the spatial and angular domains; and selecting appropriate frames which to sample edgels from for increased real time performance of an edge based tracker. In some cases, process 204 is initiated by receiving a command, or a request to track the object or target.

At block 205, edgels of a reference image frame (RF) are obtained. Block 205 may include obtaining a reference image frame (RF) of pixel data, and identifying edges and/or edgels in the RF. These edgels may include edgels of edge pixels of an object to be tracked in a subsequent CF (e.g., RF object edgels), such as by detecting a plurality of edgels of an object in the RF to be tracked in a subsequent frame (e.g., a CF). This may include capturing an image using a camera and any processing of the image's image data in order to provide pixel illumination or magnitude values or data for each pixel in the RF and computing magnitude gradients of edgels. In some cases, block 205 may include previously obtaining pixel data of the RF and extracting the edges during a prior, off-line process. The RF may be taken from a certain camera pose. For example, the RF of the planar objects can be obtained by taking one image from the front parallel position. The 3D objects can have multiple RFs because one RF may not cover whole surfaces of the objects. In some case, the RF may be an image of or including an object it is desired to track, where the image is taken, obtained or received from a prior off-line process, or from a camera from the front parallel position to the object.

In some embodiments, block 205 includes obtaining an image of an object to be tracked from a prior off-line process, or from a camera that images from a front parallel position to the object to be tracked and the current image frame comprises an image frame taken from the camera. In some cases, obtaining edgels of edge pixels of an object in the RF comprises obtaining locations, normals, and magnitude gradients of edgels (e.g., edge pixels) of interest of the RF object.

According to some embodiments, block 205 may include determining camera pose (e.g., determined for the RF or from a PF). In some cases, block 205 may use processes known in the art for edgel extraction, edge feature extraction, and determining camera pose. An example of block 205 may include detecting edgels of object 134 in the reference frame (RF) to be used for tracking. The edgels of object 134 may be searched for in the next camera frame (e.g., the CF).

In some embodiments, the RF may be an image of or including an object it is desired to track, taken at block 152 and detected at block 154. In some case, the RF may be an image of or including an object it is desired to track, provided at block 162.

In some embodiments, luminance or brightness of each pixel may be in a range from 0-255; or 1 byte (8 bits) of luminance data. This may correspond to color, RGB, BW, or conversion of color to grey scale. In some cases the luminance may be represented by one or more bytes, 2 bytes, 2 or more bytes, etc. This data may be described as raw pixel data, luminance, e.g., for every, or all pixels of the frame.

At block 210, the reference frame may be divided into N vertical (e.g., column) by M horizontal (e.g., row) bins of pixel data. Block 210 may include dividing the reference frame into a plurality of bins. In some cases N=M, while in other cases they are not the same. For example, FIG. 3A shows an exemplary image of reference frame 300 divided into six by six bins defined by 5×5 the hash marks (horizontal and vertical lines) within the image boundary. The hash marks shown are exemplary and for explanatory purposes only and do not appear in the RF. According to embodiments, block 210 may include preprocessing performed to divide the image or frame into N×M bins where various bins may include edges from which edgels are to be selected for performing tracking Dividing the image or frame into N×M bins may be done as known in the art. In some cases, N and/or M may equal a number between 10 and 20. In some cases, N and/or M equal 10. In some cases, N and/or M equal 20. In some cases, N and/or M may be determined by observations of experimental results.

In some embodiments, an upper bound may be placed on M and N based on experimental results or system parameters and/or desired performance because a large N and/or M may use additional time for sampling. In some embodiments, block 210 may comprise functionality in the descriptions of block 162 above pertaining to division of the image and sampling of edgels, including those of a tracked object (e.g., such as by sampling of the CF at block 164). In some embodiments, block 210 includes splitting an area of the RF into a grid of bins.

In some embodiments, N and M may be determined by experimental results, such as based on factors balancing (1) an increased number of bins to provide more edgels to be projected to assure an acceptable tracking accuracy, against (2) an decreased number of bins to provide fewer edgels to be projected to assure an acceptable limit of time for performing the tracking (e.g., to provide real time performance or calculation of the camera pose for the subsequent frames). In some embodiments, to reduce the time for projection of edgels in the RF, a number of N and M are selected to provide an adequate number of bins or grids so that fewer edgels are projected. For example, where a bit dense grid may be used, such as where M and N=40×40, there are 1600 projections of the edgels are used to find out valid bins (e.g., at block 240). For a 20×20 case, only 400 projections are used. However, if the grid is reduced to 10×10 (e.g., rather small size), the grid may become too big so that many good edgels are lost and valid bins may not include the bins close to the image border for better sampling. In some cases, N and/or M may equal a number between 10 and 40; or between 20 and 40.

At block 220 Q edgels with the strongest magnitude of lumination gradients are selected for or from each bin. This may include determining and extracting the Q edgels with the strongest or largest magnitude of lumination gradients for each bin. Determining which edgels have the strongest magnitude of gradients may be performed as known in the art. In some cases, Q may be between 4 and 20. In some case Q may be 10. In some cases, factors or considerations for determining Q include at least having Q satisfy N×M×Q>desirable number of samples condition. In some cases, Q may be a predefined number; and may be based on factors including processing time. In some embodiments, Q may be determined by experimental results, such as based on factors balancing (1) an increased number of Q edgels to provide more edgels to be projected to assure an acceptable tracking accuracy, against (2) an decreased number of Q edgels to provide fewer edgels to be projected to assure an acceptable limit of time for performing the tracking (e.g., to provide real time performance or calculation of the camera pose for the subsequent frames) (e.g., similar to N and M). In some cases, Q may be larger for better tracking, but limited by not making that tracking time too long. In some embodiments, Q=64.

In some cases, determining the strongest/largest magnitude gradients may include selecting edgels that have the largest contrast over the shortest amount of distance in the normal direction of the edgel. This may also include selecting edgels with the most easily identified edges in the image, such as with respect to contrast and size differentiation. The gradients may be defined with respect to XY coordinates in the plane of the image. The orientation of the edgels may be maintained or stored (e.g., storing in a memory) for subsequent tracking.

At block 230, in some embodiments, one edgel per bin is projected into the image plane of a current frame (CF) to find bins that are "valid" to be used for tracking. In some embodiments, block 230 may include determining a plurality of valid bins, each valid bin containing a selected edgel that can be found within the current image. In some embodiments, block 230 may include projecting only a strongest gradient edgel for each bin into the CF using an estimated pose of the edgel data set of the object based on a prior image frame (PF), or another "estimated" pose. In some embodiments, the one edgel per bin to be projected can be a randomly chosen edgel (e.g., at block 230) per bin, randomly chosen from edgels sampled in block 205 or block 220. In some embodiments, at block 230, a random selection of one edgel of the edgels with the strong magnitude of lumination gradients (e.g., extracted in block 220) is selected or extracted for or from each bin. In some embodiments, this may include randomly selecting one of many edgels per bin, as known in the art.

According to some embodiments, the one edgel is projected according to an estimated pose of the edgel data set of the object using a prior image frame (PF), or according to the estimated pose of the CF calculated using (e.g., based on) the previous camera pose. In some embodiments, the one edgel per bin is projected into the image plane of a current frame (CF) according to an existing previous pose, sensor's pose, or a pose generated using a motion model. For example, the previous pose may be a pose at PF, the sensor's pose may be a pose from sensor, and a motion model pose may be a pose from a physical motion model. According to some embodiments, the pose used at block 230 to project the edgels from each bin, may be estimated or generated, such as is known in the art.

In some embodiments, the CF is not an exact representation, because the estimated pose from the pose of a prior frame (PF) is used. In some embodiments, the pose used at block 230 may be the previous camera pose (e.g., determined for a prior frame (PF)). For example, when the object is detected a first time (i.e., there is no previous pose from a PF), the pose obtained from the detection may be used (e.g., pose of the RF). In some case, the CF may be an image of or including at least a portion of the object it is desired to track, taken at block 152 and provided to or received at block 164 (e.g., where it is possibly sampled). For instance, the CF may include some or all of the edgels of the object being tracked, such as CF object edgels corresponding to the at least a portion of the RF object being tracked.

FIG. 3A shows an image of reference frame (RF) 300 divided into six by six bins and having edgels in bins 310, 312, 314, 316 and 318. Projecting one edgel per bin may include selecting the edgel with the strongest magnitude of gradients for that bin (e.g., having the strongest gradient for that bin in block 220).

In other cases more than one edgel per bin may be selected, such as selecting two or three edgels with the strongest magnitude of gradients for each bin. Projecting the edgel into the image plane (e.g., of the CF) may be done as known in the art.

At block 240 valid bins are identified as bins having their one edgel found within the borders of the image space of the current image frame. Determining that a bin is valid (e.g., in the RF) may correspond to determining that the projected edgel is within the boundary (or image borders) of the CF. In some cases a bin is identified as valid if the edgel of the CF identified as corresponding to the projected edgel (e.g., by processes known in the art) is found inside the image boundary of the CF. A bin that is not identified as "valid" may be identified as "invalid" and may not be considered or used for tracking. For example, as shown in FIG. 1D edgel corresponding to E5R (e.g., edgel E5C) is not within frame 142 (e.g., it is beyond the left border or boundary of the frame as shown by its location one the dashed lines. In some embodiments, during block 240, edgel E5R may be projected into CF 142 to determine that the bin containing edgel E5R is invalid.

FIG. 3B shows bins of RF 320 identified as valid (clear or with edgels) and invalid (blacked out), where the valid bins are identified by projecting only one edgel in each bin into the image plane (e.g., CF) and finding that edgel in the CF image. In some cases, FIG. 3B shows an image of the reference frame 320 identifying valid bins 322, 324, 326 and 328 for which the corresponding edgel is detected and found in the CF (e.g., corresponding to edgels in bins 312, 314, 316 and 318). The invalid bins are blacked out.

In some cases, block 210 includes using the RF 2D position (edgel locations) data to determine or make the N×M bins; while block 240 includes using the RF 3D position data of edgels to find out or identify valid bins by projecting them onto the CF.

Determining that a bin is valid may also include determining that the illumination of the edgel of the CF identified as corresponding to the projected edgel, changes by less than a certain threshold. In some cases, identifying valid bins includes determining whether the bins are occluded or not in the CF image by comparing mean of pixel values of the bin from the RF with the bin in the CF in which the corresponding edgel is found. In these cases, the valid bins may (1) have the one edgel found in the CF image boundary, and (2) have the bin that edgel is found in not occluded by other objects in the CF image.

Block 240 may include beginning tracking or a tracking phase. In some embodiments, block 240 may include performing blocks 205, 210 and 220 on the current frame CF, such as a subsequent image frame from the same camera in which the object may be tracked. Block 240 may also include determining or detecting edgels of the CF identified as corresponding to edgels of the RF, such as corresponding to the edgels projected, by processes known in the art.

Next, for some embodiments, at optional blocks 250, 252 and 254 it is determined whether the current image frame should continue to be sampled and/or used for tracking. In some embodiments, blocks 250-254 are performed. For example, blocks 250-254 may be performed in instances where a prior frame has been sampled and a number of valid bins for that prior frame has been determined or counted. In some embodiments blocks 250-254 may not be performed. Blocks 250-254 may not be performed in instances where a prior frame has not been sampled, or for other reasons.

At optional block 250 the difference between the number of valid bins of the reference frame and the number of valid bins of a prior frame is calculated. The prior frame may be a previously acquired reference frame, a detected frame, or a prior tracked frame. The prior frame may be the previous frame or a frame 2 or more frames earlier in image or camera frame sequence.

In some cases, block 250 includes calculating the number of valid bins in the RF as compared to the number of valid bins determined for one or more prior frames. Block 250 may include subtracting the number of valid bins in RF from the number of valid bins in the prior frame to determine if the difference in those bins is greater than a sampling threshold. Block 250 may include subtracting the number of valid bins identified at block 240 for the current frame from the number of valid bins identified (e.g., at block 240) for the prior frame.

At optional decision block 252 it is determined whether the difference is greater than a threshold. If the difference is greater than (or equal to) than a threshold, process 204 continues to block 260, such as to continue to sample and/or use the current image frame for tracking. If the sampling demand is not greater than a threshold, process 204 may move to optional block 254. Blocks 250-252 may describe a process for quickly checking the "sampling demand" of the FIG. 3B or of block 240 by subtracting.

At optional block 254 the current frame is not sampled further and tracking using the CF is stopped. In some cases, after block 254 tracking is continued by using the sampled edgels from the prior frame. At block 254, process 204 may be continued to block 290 where edge based tracking may be performed using the edges selected for tracking of the prior frame. This provides the benefit of not sampling every frame, such as in the case of small camera movement, where a pose update may not be necessary, or does not provide significant difference in the image presented to the user. Thus, not sampling in this case will not provide the user an unnatural or unintuitive experience, since the camera did not move far enough to provide such experience.

In some case the sampling threshold may be selected based on experimental data and/or histories. In some cases, the sampling threshold may be between 2 and 5 bins. In some case, the sampling threshold may be 3 or 4 bins such as where N equals 20. In some case, the sampling threshold may be 4 bins. The sampling threshold may be selected based on a target (e.g., object) texture. For example, an image with a high target texture, such as an image of the boxes may have all bins identified as valid. On the other hand a low target texture such as an image of an apple may have less than 100 of the 400 bins identified as valid.

If sampling continues from block 252 to block 260; or if blocks 250, 252 and 254 are not performed, process 204 continues to block 260.

At optional block 260 only the valid bins are selected or rearranged (reordered) as N*×M* bins (optionally performed independent of blocks 250-254). Block 260 may include rearranging or selecting the bins of the image (e.g., RF image) for tracking to only include valid bins, such as by excluding the invalid bins.

FIG. 3C shows an example of selecting only the valid bins. FIG. 3C shows an image of reference frame (RF) 330 divided into five by six bins. These bins exclude the invalid bins from FIG. 3B, and include valid bins 322, 324, 326 and 328. In some cases, block 260 may include only selecting bins and edgels in bins as described at block 230 (e.g., Q edgels with strong magnitude of gradients) for bins that are valid.

It is considered that although FIGS. 3B-C show one column of invalid bins, other configurations or patterns of valid/invalid bins may exits. There may be any number or arrangement of the invalid bins. At block 240 the invalid bins may be identified, and at block 260 whichever bins are not valid are removed from consideration. Thus the reordering at block 260 may include maintaining (e.g., storing in a memory) the sequence and relative locations of the valid bins.

At block 270 K edgels with different orientation are selected from each valid bin. Block 270 may include selecting a subset of edgels of the object from each of the valid bins, each of the subset of edgels having a different angular orientation. Selecting K edgels may include selecting a subset or all of Q edgels of each valid bin. Block 270 may include dividing the angular domain of each bin into angular "segments", "subdivisions" or "ranges" which are each an equal divisions of 180 degrees (or 360 degrees). For example, each bin may be divided into between 4 and 20 angular ranges. In some cases, each bin is divided into 4 ranges, such as a first range of between 0 and 45°; a second range of between 45° and 90°; a third range of between 90° and 135°; and a fourth range of between 135° and 180°. The angular domain for ranges between 180° and 360° provides a repeat of the edgels in the angular domain between 0 and 180°. In a case where 18 ranges are selected, for example, there are 18 ranges, each having a range of 10°. In some cases, 0° may be identified as a direction from left to right. In other cases, 0° can be identified in another angular orientation.

FIG. 3D shows an example of an order of processing the bins or selecting K edgels with different angular values in each bin. FIG. 3D shows RF 330 having valid bins processed in order 340. In some cases this may be described as a "visiting order" for processing each bin to select K edgels. Block 270 may include a processing order at select K edgels for each bin, among valid bins along the image border and moving from the image border towards the image center. After block 270 the maximum total number of selected edgels may be equal to N*×M*×K. For an example of 5×6 valid bins with 4 each ranges, the total is 120 total edgels.

For instance, FIG. 3D shows an embodiment where the order starts by moving along (e.g., down) outer border 341, then moves (to the next adjacent outer border bin and) along outer border 342, then outer border 343, and then along outer border 344 by moving to the next adjacent bin outer border each time visiting of one border is completed. At this point it has moved along all of the outer borders and then continues by moving along the next outermost borders (e.g., after the prior bins are visited). FIG. 3D shows that the order continues by moving along (e.g., down) next outermost border 351, then continues to the next adjacent bin of along next outermost border 352, then next outermost border 353, and then along next outermost border 354. This process continues and the final border, the innermost border 361 is visited. It can be appreciated that a frame having more valid bins or borders can be processed in a similar way. It is also noted that border 361 is innermost, borders 351-354 are next innermost, and borders 341-344 are next (last) innermost.

It can be appreciated that a processing order other that shown in FIG. 3D may be used. For example a visiting order may be used where the order of processing the bins begins at one edge of the image, processes all of the valid bins along that edge of the image, then moves to the next edge having the most valid bins (although not necessarily adjacent or in sequential order shown in FIG. 3D), processes the next edge having the most valid, etc., until all edges are visited. After block 270 the maximum total number of selected edgels may be equal to N*×M*×K.

By example, in some embodiments, for a case where 4 ranges are selected above, the first bin visited may have 1 edgel selected from that bin from each of the 4 ranges. Then the second bin visited may then have 1 edgel selected from that bin from each of the 4 ranges. The process repeats until all the valid bins are visited. It can be appreciated that other ranges and orders are considered, as appropriate. For 5×6 valid bins with 4 each ranges, the total is 120 total edgels.

In some embodiments, block 270 includes selecting a subset of K edgels of the RF object edgels, each of the K edgels within a different angular orientation range of a plurality of valid bins of the N×M bins, each valid bin having a strongest magnitude gradient RF object edgel found within borders of the CF of pixel data. For some embodiments, if the edgel with the strongest magnitude gradient in any RF bin has its pose projection found in the CF, then K edgels of that bin are selected, where each of the K edgels is in a different angular range of between 0 and 10 degrees, between 10 and 20 degrees, or between 20 and 30 degrees.

At block 280 it is determined whether the number of selected edgels should be reduced to a desirable edgel number, or to below the desirable edgel number. Determining a desirable edgel number may be performed as known in the art. In some case the number may be between 50 and 75. In some cases the number is 64.

Block 280 may include determining whether N*×M*×K is larger than the desirable edgel number. If it is larger, selected edgels of bins (or entire bins of edgels) may be removed from processing. In some cases, this may be done by selecting edgels of bins (or entire bins) in the center (e.g., the innermost border) of the image and removing those first. This may include first removing edgels of bins along border 361 (innermost). If more edgels are to be removed, then edgels of the next centermost bins may be removed (e.g., the next innermost border or borders), etc. This may include next, removing edgels of bins along one or more of borders 351-354 (e.g., next innermost bins or next centermost bins).

Block 280 may include reducing edgels by eliminating edgels from the inside in keeping edgels on the outside bins. By maintaining edgels on the image border, or removing edgels from the center of the edgel first may provide increased accuracy of calculating camera pose, or providing a more stable or robust camera pose calculation. In some cases, edgels or bins of edgels can be removed randomly, such as by randomly selecting bins and/or edgels for removal (and then removing the randomly selected bins and/or edgels). In some cases, the centermost-order removal is better than random-order removal. This may include randomly selecting one of many bins and/or edgels, as known in the art. In some embodiments, the valid bins are visited in the random order and get K edgels from them.

FIG. 3E shows an example of selecting reduced edgel numbers to keep the number of edgels for tracking less than or equal to a desirable edgel number. FIG. 3E shows an example of RF 330 having borders of bins A, B and C. In some cases, block 280 includes selecting, obtaining, or maintaining the edgels of all of A, then B, then C where A represents edgels from the image border, B represents edgels from the bins that are next closest to the image border, etc.

In one example, border A may have 50 percent, border B may have 30 percent and border C may have 20 percent of the desired edgels (e.g., for an aggregate of 100 percent). FIG. 3E shows and example of selecting edgels from the image border A (outermost) and from the border B, the bins next closest to the image border (next outermost). In this case, 80 percent of all of the maximum N*×M*×K edgels are selected, and provide a number of edgels for tracking that is maximum desirable edgels number. FIG. 3E also shows that edgels of bins C, the centermost bins are not selected or are the edgels removed from tracking processing.

In some case, block 164 includes descriptions of blocks 220-280 (including or excluding the optional blocks in blocks 220-280). For example, after block 164 the selected edges of block 280 or block 254 may be provided to block 290 (e.g., block 166) for tracking.

In some embodiments, block 280 includes determining that N*×M*×K is larger than a desirable edgel number for tracking; and removing a subset of the N*×M* bins from processing to create a remaining set (e.g., a subset) of valid bins by first removing bins of the subset of the N*×M* bins in the center of the image. In some cases, block 210 includes determining the desirable edgel number for tracking based on factors including using a number that is not too large or uses too many resources, or too small to successfully track the object. In some cases, block 210 includes removing bins to reduce the number of edgels to at or below the desirable edgel number and includes maintaining bins of an outer perimeter of the RF image (e.g., maintaining bins of borders 341-344 or of border A).

At block 290 edge-based tracking may be performed to track edges in current frame that are found in the prior frame. Here, the edgels selected at block 280 (e.g., such as edgels selected from object 110, possibly those shown in FIG. 1C) may be considered or used for tracking the object from a reference frame in the subsequent current frame (CF) (e.g., the later image frame of block 230). Block 290 may include performing edge-based tracking for real time camera position and orientation (pose) using the subset of K edgels. In some cases, such as where processing continues from block 254 to block 290, block 290 may include performing edge-based tracking using the edges selected for tracking of the object in the prior frame (e.g., from a frame prior to the prior frame).

After selecting the edgels, their positions can be searched for in the next camera frame. Thus, selected edgels of the RF will be searched and compared with edgels in the CF (e.g., corresponding edgels of the same object) to perform tracking. Then, using the corresponding relations of the edgels in the two frames, the 6 Degrees of Freedom (DOF) pose can be computed for the camera taking the image frames. The corresponding relations may include the locations (e.g., positions) and orientations of the same identified edgels, edges or objects in the two frames. These locations and orientations may be different (e.g., may have moved) from one frame to the next.

In some embodiments, block 166 includes descriptions of block 290, blocks 280-290, and or blocks 254-290 (including optional block 254).

In some embodiments, after performing block 290, processing returns to block 230 where edge based tracking may be performed using the edges selected for tracking of another subsequent or next current frame (e.g., after the prior CF above) obtained from the camera and used in place of the prior CF.

By performing blocks 210-240 and 260-280 it is possible to get the optimal numerically stable edgels with significantly less projections. In addition, by performing optional block 250-254 it is possible to reduce the tracking time, processing, and power used to perform the tracking phase. These benefits are compared to other sampling methods that project all edgels onto the image plane of the CF, which are expensive, and which do not guarantee a stable condition for tracking.

Figure 4:
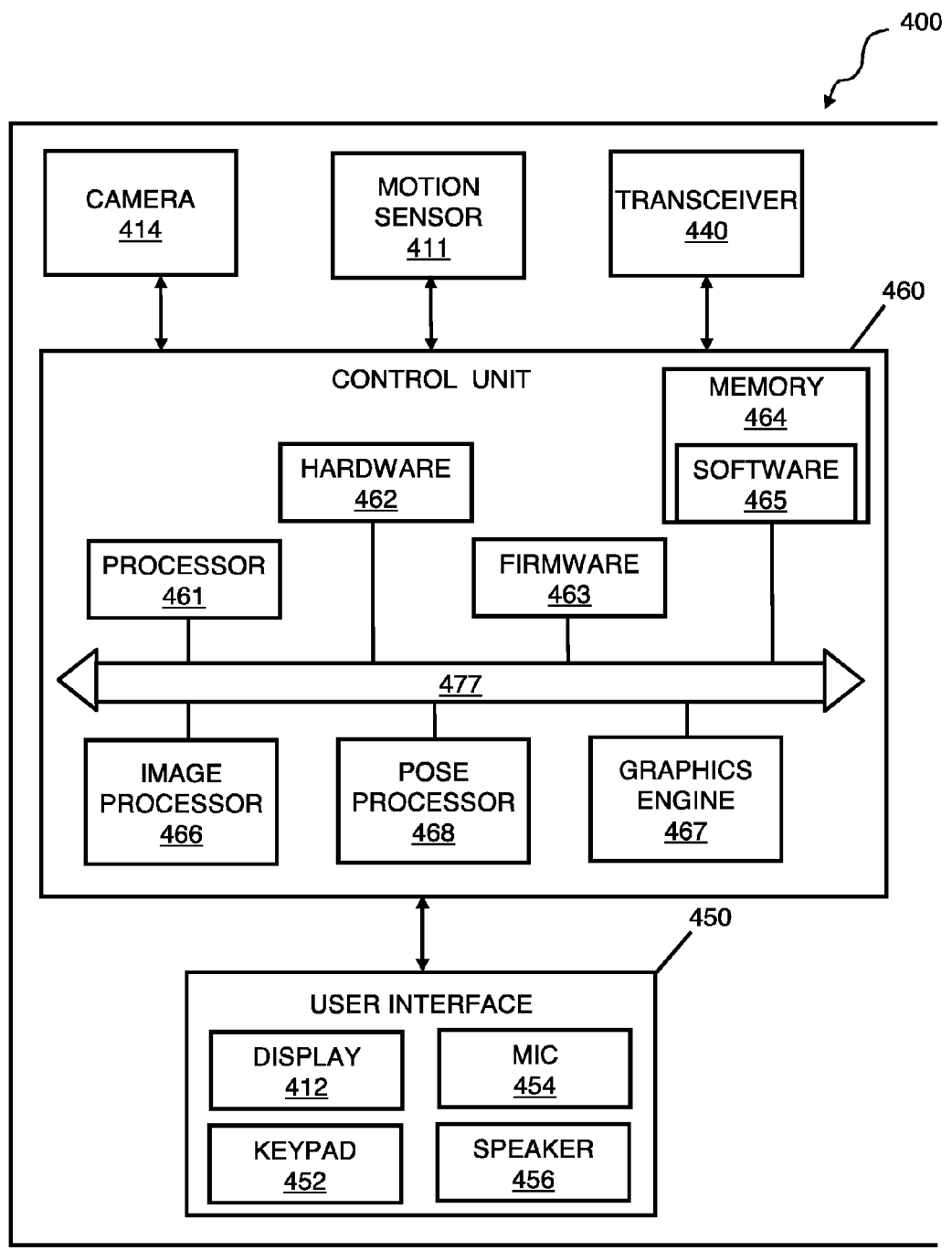
FIG. 4 shows an example of a block diagram of a system in which aspects of disclosed embodiments may be practiced.

FIG. 4 is a block diagram of a system in which aspects may be practiced. The system may be a device 400, which may include a general purpose processor 461, image processor 466, pose processor 468, graphics engine 467 and a memory 464. Device 400 may also include a number of device sensors coupled to one or more buses 477 or signal lines further coupled to the processor(s) 461, 466, and 468. Device 400 may be a: mobile device, wireless device, cell phone, personal digital assistant, mobile computer, tablet, personal computer, laptop computer, or any type of device that has processing capabilities.

In one embodiment device 400 is a mobile platform. Device 400 can include a means for capturing an image of a planar or non-planar target, such as camera 414 (e.g., a still frame and/or video camera) and may optionally include motion sensors 411, such as accelerometers, gyroscopes, electronic compass, or other similar motion sensing elements. Device 400 may also capture images on a front or rear-facing camera (e.g., camera 414). Any of the cameras may be able or used to capture or obtain RF, PF, and CF as described herein.

The device 400 may further include a user interface 450 that includes a means for displaying the images and/or objects, such as display 412. The user interface 450 may also include a keypad 452 or other input device through which the user can input information into the device 400. If desired, integrating a virtual keypad into the display 412 with a touch sensor may obviate the keypad 452. The user interface 450 may also include a microphone 454 and speaker 456, e.g., if the device 400 is a mobile platform such as a cellular telephone. Of course, device 400 may include other elements unrelated to the present disclosure, such as a satellite position system receiver.

It should be appreciated that device 400 may also include a display 412, a user interface (e.g., keyboard, touch-screen, or similar), a power device (e.g., a battery), as well as other components typically associated with electronic devices.

Display 412 may able or used to display any or all of RF, PF, and CF including the object being tracked, as described herein. Display 412 may also be able or used to display any or all of edges, edgels, poses, and tracking, as described herein.

When the device 400 is a mobile or wireless device that it may communicate via one or more wireless communication links through a wireless network that are based on or otherwise support any suitable wireless communication technology. For example, in some aspects computing device or server may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet websites, etc.

A user's experience (e.g., of device 400) can be greatly enhanced by providing improved planar target tracking or 3D objects tracking devices, systems, software or processes as described herein. Such improvements may include obtaining optimal conditions for determining a cameras pose, or camera pose updates, and selecting which frames of the sequence of frames to sample as described herein.

In some embodiments, obtaining optimal conditions for determining a cameras pose, or camera pose updates, and selecting which frames of the sequence of frames to sample as described herein may be provided by logic of pose processor 468. Such logic may include hardware circuitry, computer "modules", software, BIOS, processing, processor circuitry, or any combination thereof. Such optimal conditions may include some or all of the processes of FIGS. 2A, 2B and/or 2C. Such logic may include an edgel selection, an edge-based tracker, and a pose prediction computer "module" to perform some or all of the processes of FIGS. 2A, 2B and/or 2C. In some cases, these modules may be part of or included in pose processor 468 or device 400. In some embodiments, an edgel selection computer module may perform some or all of blocks 164, or 205-280; an edge-based tracker computer module may perform some or all of blocks 166-168 or 290; and a pose prediction computer module may perform real time camera position and orientation (pose) based on the edge based tracking results (e.g., based on the edges tracked at block 166 or 290).

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

In some embodiments, the teachings herein may be incorporated into (e.g., implemented within or performed by) a variety of apparatuses (e.g., devices, including devices such as device 400). Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps (or processes) of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, flash memory, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware (e.g., hardware 462), software (e.g., software 465), firmware (e.g., firmware 463), or any combination thereof (which may be represented as pose processor computer module 468). If implemented in software as a computer program product, the functions or modules may be stored on or transmitted over as one or more instructions or code on a non-transitory computer-readable medium, such as having data (e.g., program instructions) therein which when accessed by a processor causes the processor, and/or hardware to perform some or all of the steps or processes described herein. In some cases, a computer program product having a computer-readable medium comprising code to perform the processes described herein (e.g., any or all of FIGS. 2A-C). In some cases, an article of manufacture of a computer system comprising a non-transitory machine-readable medium having data therein which when accessed by a processor causes an edgel selection module, edge-based tracker module, or pose processor manager to perform the processes described herein (e.g., any or all of FIGS. 2A-C).

Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Various modifications to the embodiments above will be readily apparent to those skilled in the art, and the generic principles defined herein may be applied to other embodiments without departing from the spirit or scope. For example, the object being tracked may be interpreted or represented as a 2D or as a 3D object. Thus, the present disclosure is not intended to be limited to the embodiments shown herein but is to be accorded the widest scope consistent with the principles and novel features disclosed herein.

What is claimed is:

1. A machine implemented method comprising:
    obtaining a reference image comprising an object to be tracked;
    detecting, in the reference image, a plurality of edgels of the object to be tracked;
    dividing the reference image into a plurality of bins;
    determining one or more valid bins from the plurality of bins in the reference image, wherein, each valid bin contains a corresponding at least one edgel of the object to be tracked that corresponds to an edgel of a tracked object in a current image captured subsequent to the reference image; and
    selecting, from each valid bin in the reference image, a corresponding subset of the plurality of edgels of the object to be tracked, wherein, in each subset with a plurality of edgels to be tracked, edgels of the object to be tracked with differing angular orientations are favored for selection in the subset.

2. The method of claim 1, further comprising performing edge-based tracking to determine, in real time, a camera position and orientation (pose) based, in part, on at least one of the subsets of edgels of the object to be tracked.

3. The method of claim 1, wherein, in each valid bin, the corresponding at least one edgel of the object to be tracked comprises one of: a strongest illumination gradient magnitude edgel of the object to be tracked, or a randomly chosen edgel of the object to be tracked.

4. The method of claim 1, wherein determining the one or more valid bins in the reference image comprises:
    extracting, from each bin in the reference image, Q corresponding strongest illumination gradient magnitude edgels of the object to be tracked;
    projecting, from each bin, a strongest illumination gradient magnitude edgel of the Q corresponding edgels into the current image using an estimated pose of an edgel data set of the object to be tracked; and
    identifying the one or more valid bins, based, in part, on a determination that, for each valid bin in the one or more valid bins, the projected strongest illumination gradient magnitude edgel of the object to be tracked corresponds to an edgel of the tracked object lying within a boundary of the current image.

5. The method of claim 4, wherein the estimated pose is based on at least one of: a prior image, a pose of the prior image, a pose determined by a sensor, or a pose generated using a motion model.

6. The method of claim 4, wherein identifying the one or more valid bins comprises:
    obtaining edgel data of the current image including at least a portion of the tracked object; and
    determining, based on edgels of the tracked object in the current image, corresponding projected strongest illumination gradient magnitude edgels of the object to be tracked.

7. The method of claim 1, wherein:
    dividing the reference image comprises:
        dividing the reference image into a grid of NxM bins; and
    selecting, for each valid bin, the corresponding subset, comprises:
        selecting, from each valid bin in the grid of N*xM* valid bins, K corresponding edgels of the object to be tracked with different angular orientations wherein, the grid of N*xM*valid bins is obtained by rearranging a plurality of valid bins in the NxM bins of the reference image to form the grid of N*x M* valid bins.

8. The method of claim 7, further comprising:
    determining that N*xM*xK is larger than a desirable edgel number for tracking; and
    removing a subset of the N*xM* bins from processing to create a remaining set of valid bins wherein the removed subset of bins is from a center of the reference image.

9. The method of claim 8, further comprising performing edge-based tracking for real time camera position and orientation (pose) using only the K corresponding edgels of the object to be tracked with different angular orientations in each valid bin of the remaining set of valid bins.

10. The method of claim 1, further comprising:
    removing one or more edgels of the object to be tracked from each selected subset either (1) randomly, or (2) from valid bins starting at a center of the reference image until a number of remaining edgels is less than a maximum desirable edgel number.

11. The method of claim 2, further comprising:
    prior to selecting, for each valid bin, the corresponding subset of edgels of the object to be tracked, calculating a difference between a number of valid bins of a current frame and a number of valid bins of a prior frame; and
    when the difference is greater than a sampling threshold, performing the edge-based tracking, or
    performing the selection, for each valid bin, of the corresponding subset of edgels of the object to be tracked.

12. A device comprising:
    an edgel selection module configured to:

obtain a reference image comprising an object to be tracked;

detect, in the reference image, a plurality of edgels of the object to be tracked;

divide the reference image into a plurality of bins; and determine one or more of valid bins from the plurality of bins in the reference image, wherein, each valid bin contains a corresponding at least one edgel of the object to be tracked that corresponds to an edgel of a tracked object in a current image captured subsequent to the reference image; and select, from each valid bin in the reference image, a corresponding subset of the plurality of edgels of the object to be tracked, wherein, in each subset with a plurality of edgels to be tracked, edgels of the object to be tracked with differing angular orientations are favored for selection in the subset.

13. The device of claim 12, further comprising a display to display the current image including the tracked object.

14. The device of claim 12, further comprising an edge-based tracking module to perform edge-based tracking in real time, to obtain a camera position and orientation (pose) based, in part, on at least one of the subsets of edgels of the object to be tracked.

15. The device of claim 12, wherein, in each valid bin, the corresponding at least one edgel of the object to be tracked comprises one of: a strongest illumination gradient magnitude edgel of the object to be tracked, or a randomly chosen edgel of the object to be tracked.

16. The device of claim 12, wherein to determine the one or more valid bins in the reference image, the edgel selection module:

extracts, from each bin in the reference image, Q corresponding strongest illumination gradient magnitude edgels of the object to be tracked;

projects, from each bin, a corresponding strongest illumination gradient magnitude edgel of the Q corresponding strongest illumination gradient magnitude edgels into the current image using an estimated pose of an edgel data set of the object to be tracked; and identifies the the one or more valid bins, based, in part, on a determination that, for each valid bin in the one or more valid bins, the projected strongest illumination gradient magnitude edgel of the object to be tracked corresponds to an edgel of the tracked object lying within a boundary of the current image.

17. The device of claim 16, wherein the estimated pose is based on at least one of: a prior image, a pose of the prior image, a pose determined by a sensor coupled to the device, or a pose generated using a motion model.

18. The device of claim 16, wherein to identify the one or more valid bins the edgel selection module:

obtains pixel data of the current image including at least a portion of the tracked object; and determines, based on edgels of the tracked object in the current image, corresponding projected strongest illumination gradient magnitude edgels of the object to be tracked.

19. The device of claim 12, wherein the edgel selection module is configured to divide the reference image into a grid of NxM bins and, to select, for each valid bin, the corresponding subset, the edgel selection module is configured to:

select, from each valid bin in the grid of N*xM* valid bins, K corresponding edgels of the object to be tracked with different angular orientations wherein, the grid of N*xM*valid bins is obtained by rearranging a plurality of valid bins in the NxM bins of the reference image to form the grid of N*x M* valid bins.

20. The device of claim 19, wherein the edgel selection module is further configured to:

determine that N*xM*xK is larger than a desirable edgel number for tracking; and remove a subset of the N*xM* bins from processing to create a remaining set of valid bins wherein the removed subset of bins is from a center of the reference image.

21. The device of claim 20, further comprising an edge-based tracker module to perform edge-based tracking for real time camera position and orientation (pose) using only the K corresponding edgels of the object to be tracked with different angular orientations in each valid bin of the remaining set of valid bins.

22. The device of claim 12, wherein the edgel selection module is further configured to:

remove the one or more edgels of the object to be tracked from a selected subset corresponding to a valid bin at a center of the reference image, and when after removal, a number of remaining edgels is not less than a maximum desirable edgel number; then remove a plurality of edgels of object to be tracked from one or more other valid bins near the center of the reference image.

23. The device of claim 13, wherein the edgel selection module is further configured to:

prior to selecting, for each valid bin, the corresponding subset of edgels of the object to be tracked, calculate a difference between a number of valid bins of the current image and a number of valid bins of a prior image; and when the difference is greater than a sampling threshold, perform the selection, for each valid bin, of the corresponding subset of edgels of the object to be tracked, or perform the edge-based tracking.

24. A non-transitory computer-readable medium embodying code for:

obtaining a reference image comprising an object to be tracked;

detecting, in the reference image, a plurality of edgels of the object to be tracked;

dividing the reference image into a plurality of bins;

determining one or more valid bins from the plurality of bins in the reference image, wherein, each valid bin contains a corresponding at least one edgel of the object to be tracked that corresponds to an edgel of a tracked object in a current image captured subsequent to the reference image; and selecting, from each valid bin in the reference image, a corresponding subset of the plurality of edgels of the object to be tracked, wherein, in each subset with a plurality of edgels to be tracked, edgels of the object to be tracked with differing angular orientations are favored for selection in the subset.

25. The non-transitory computer-readable medium of claim 24, further comprising code for displaying the current image including tracked object.

26. The non-transitory computer-readable medium of claim 24, further comprising code for performing edge-based tracking in real time, to obtain a camera position and orientation (pose) based, in part, on at least one of the subsets of edgels of the object to be tracked.

27. The non-transitory computer-readable medium of claim 24, wherein, in each valid bin, the corresponding at least one edgel of the tracked object contains a: strongest illumination gradient magnitude edgel of the object to be tracked, or a randomly chosen edgel of the object to be tracked.

28. The non-transitory computer-readable medium of claim 24, wherein determining the one or more valid bins in the reference image comprises:
   extracting, from each bin in the reference image, Q corresponding strongest illumination gradient magnitude edgels of the object to be tracked;
   projecting, from each bin, a corresponding strongest illumination gradient magnitude edgel of the Q edgels into the current image using an estimated pose of an edgel data set of the object to be tracked; and
   identifying the one or more valid bins, based, in part, on a determination that, for each valid bin in the one or more valid bins, the projected strongest illumination gradient magnitude edgel of the object to be tracked corresponds to an edgel of the tracked object lying within a boundary of the current image.

29. The non-transitory computer-readable medium of claim 28, wherein the estimated pose is based on at least one of: a prior image, a pose of the prior image, a pose determined by a sensor, or a pose generated using a motion model.

30. The non-transitory computer-readable medium of claim 29, wherein identifying the one or more valid bins comprises:
   obtaining edgel data of the current image including at least a portion of the tracked object; and
   determining, based on edgels of the tracked object in the current image, corresponding projected strongest illumination gradient magnitude edgels of the object to be tracked.

31. The non-transitory computer-readable medium of claim 24, wherein the reference image is divided into a grid of NxM bins and selecting for each valid bin, the corresponding subset comprises:
   selecting, from each valid bin in the grid of N*xM* valid bins, K corresponding edgels of the object to be tracked with different angular orientations wherein, the grid of N*xM*valid bins is obtained by rearranging a plurality of valid bins in the NxM bins of the reference image to form the grid of N*x M* valid bins.

32. The non-transitory computer-readable medium of claim 31, further comprising code for:
   determining that N*xM*xK is larger than a desirable edgel number for tracking; and
   removing a subset of the N*xM* bins from processing to create a remaining set of valid bins wherein the removed subset of bins is from a center of the reference image.

33. The non-transitory computer-readable medium of claim 32, further comprising code for performing edge-based tracking for real time camera position and orientation (pose) determination using only the K corresponding edgels of the object to be tracked with different angular orientations in each valid bin of the remaining set of valid bins.

34. The non-transitory computer-readable medium of claim 24, further comprising code for:
   removing a plurality of edgels of the object to be tracked either: (1) randomly, or (2) from valid bins starting at a center of the reference image until a number of remaining edgels is less than a maximum desirable edgel number.

35. The non-transitory computer-readable medium of claim 26, further comprising code for:
   prior to selecting, for each valid bin, the corresponding subset of edgels of the object to be tracked, calculating a difference between a number of valid bins of a current frame and a number of valid bins of a prior frame; and
   when the difference is greater than a sampling threshold, performing the edge-based tracking, or
   performing the selection for each valid bin, of the corresponding subset of edgels of the object to be tracked.

36. A computing device comprising:
   means for obtaining a reference image comprising a tracked object;
   means for detecting, in the reference image, a plurality of edgels of the object to be tracked;
   means for dividing the reference image into a plurality of bins;
   means for determining one or more valid bins from the bins in the reference image, wherein, each valid bin contains a corresponding at least one edgel of the object to be tracked that corresponds to an edgel of a tracked object in a current image captured subsequent to the reference image; and
   means for selecting, from each valid bin in the reference image, a corresponding subset of the plurality of edgels of the object to be tracked, wherein in each subset with a plurality of edgels to be tracked, edgels of the object to be tracked with differing angular orientations are favored for selection in the subset.

37. The computing device of claim 36, further comprising means for displaying the current image including the tracked object.

38. The computing device of claim 36, further comprising means for performing edge-based tracking in real time, to obtain camera position and orientation (pose) based, in part, on at least one the subsets of edgels of the object to be tracked.

39. The computing device of claim 36, wherein the at least one edgel of the object to be tracked comprises one of a strongest: illumination gradient magnitude edgel of the object to be tracked in the valid bin, or a randomly chosen edgel of the object to be tracked.

40. The computing device of claim 36, wherein means for determining the plurality of valid bins in the reference image comprises:
   means for extracting, from each bin in the reference image, Q corresponding strongest illumination gradient magnitude edgels of the object to be tracked;
   means for projecting, from each bin, a corresponding strongest illumination gradient magnitude edgel of the Q corresponding strongest illumination gradient magnitude edgels into the current image using an estimated pose of an edgel data set of the object to be tracked; and
   means for identifying the one or more valid bins, based, in part, on a determination that, for each valid bin in the one or more valid bins, the at least one projected strongest illumination gradient magnitude edgel of the object to be tracked object corresponds to an edgel of the tracked object lying within a boundary of the current image.

41. The computing device of claim 40, wherein the estimated pose is based on at least one of: a prior image, a pose of the prior image, a pose determined by sensing means coupled to the computing device, or, a pose generated using a motion model.

42. The computing device of claim 40, wherein means for identifying the one or more valid bins comprises:
   means for obtaining edgel data of the current image including at least a portion of the tracked object; and means for determining, based on edgels of the tracked object in the current image, corresponding projected strongest illumination gradient magnitude edgels of the object to be tracked.

43. The computing device of claim 36, wherein the means for dividing divides the reference image into a grid of NxM bins and wherein, means for selecting comprises:
means for selecting, from each valid bin in the grid of N*xM* valid bins, K corresponding edgels of the object to be tracked with different angular orientations wherein, the grid of N*xM*valid bins is obtained by rearranging a plurality of valid bins in the NxM bins of the reference image to form the grid of N*x M* valid bins.

44. The computing device of claim 43, further comprising:
means for determining that N*xM*xK is larger than a desirable edgel number for tracking; and
means for removing a subset of the N*xM* bins from processing to create a remaining set of valid bins wherein the removed subset of bins is from a center of the reference image.

45. The computing device of claim 44, further comprising a means for performing edge-based tracking for real time camera position and orientation (pose) using only the K corresponding edgels of the object to be tracked with different orientations in each valid bin of the remaining set of valid bins.

46. The computing device of claim 36, further comprising:
means for removing a plurality of edgels of the object to be tracked from a selected subset corresponding to a valid bin at a center of the reference image either (1) randomly, or (2) starting at a center of the reference image, and wherein, the means for removing the plurality of edgels of the object to be tracked from the selected subset further comprises:
means for removing a plurality of edgels of object to be tracked from one or more other valid bins near the center of the reference image, when after removal of the plurality of edgels from a selected subset at the center of the reference image, a number of remaining edgels is not less than a maximum desirable edgel number.

47. The computing device of claim 36, further comprising:
means for calculating a difference between a number of valid bins of the current frame and a number of valid bins of a prior frame prior to selecting each subset of edgels; and
upon a determination that the difference is greater than a sampling threshold,
means for performing edge-based tracking, or
means for selecting, for each valid bin, the corresponding subset of edgels of the object to be tracked.

* * * * *